United States Patent [19]

Marsteller et al.

[11] Patent Number: 5,086,965
[45] Date of Patent: Feb. 11, 1992

[54] FASTENER PRESS WITH WORKPIECE PROTECTION SYSTEM

[75] Inventors: K. Edward Marsteller, Willow Grove; Patrick McGlone, Bethlehem, both of Pa.

[73] Assignee: Penn Engineering & Manufacturing Corp., Danboro, Pa.

[21] Appl. No.: 611,502

[22] Filed: Nov. 13, 1990

[51] Int. Cl.$^5$ .............................................. B21J 15/28
[52] U.S. Cl. .................................... 227/8; 72/8; 72/26; 100/53; 192/134
[58] Field of Search ............... 227/1, 2, 4, 8; 100/53; 72/1, 8, 21, 26; 192/129 A, 134

[56] References Cited

U.S. PATENT DOCUMENTS

| | | | |
|---|---|---|---|
| 4,208,895 | 6/1980 | Grigorenko et al. | 72/21 |
| 4,391,358 | 7/1983 | Haeger | 72/1 |
| 4,489,578 | 12/1984 | Nagai et al. | 72/21 |
| 4,593,547 | 6/1986 | Heiberger | 72/1 |
| 4,676,421 | 6/1987 | Swanstrom | 227/8 |
| 4,936,126 | 6/1990 | Sato | 72/1 |

Primary Examiner—Mark Rosenbaum
Assistant Examiner—Scott A. Smith
Attorney, Agent, or Firm—Gregory J. Gore

[57] ABSTRACT

A programmable fastener press includes workpiece protection by utilizing punch position and punch contact sensors. The sensors signal a controller which classify portions of the punch's linear travel into multiple zones of operation. One zone is a stop window wherein any unwanted contact with the punch during its descent will cause the press to be halted and to remain stationary without being returned to home position. The press operator may, after correcting the fault condition, elect to instruct the press to proceed from the stoppage point downward continuing the normal operation of the press.

1 Claim, 4 Drawing Sheets

FIG. 3
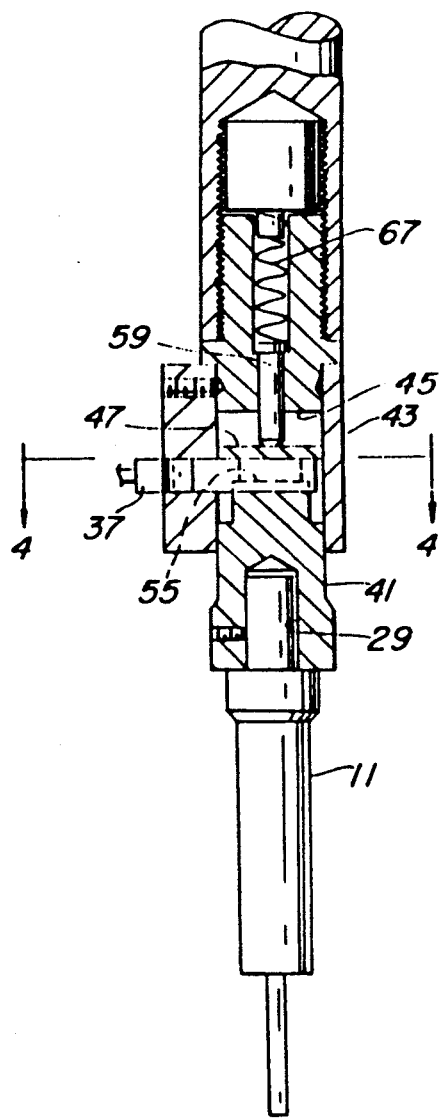
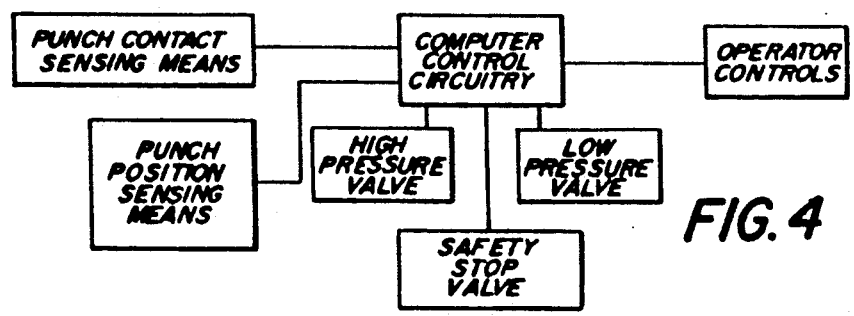
FIG. 4

FASTENER PRESS WITH WORKPIECE PROTECTION SYSTEM

FIELD OF THE INVENTION

This invention relates to an automated control system for industrial machinery. More specifically, the invention relates to semi-automated presses for installing fasteners and the like into sheet material workpieces.

BACKGROUND OF THE INVENTION

Prior art industrial presses which include safety and fault detection systems to halt the operation of an industrial press are well-known. Of particular relevance to the present invention is the PEMSERTER(R) 1000 Press manufactured by Penn Engineering & Manufacturing Corp. of Danboro, Pa. This press heretofore has included an operator safety feature which prevents the operator's fingers from being caught between the press punch and the workpiece. The functioning of this press is described in detail in U.S. Pat. No. 4,676,421 issued to Swanstrom, which is hereby incorporated by reference as though fully set forth.

To summarize the operation of the prior art, a contact sensor located between the punch and the ram is employed in combination with a punch position sensor to establish two zones of operation. Each zone represents a portion of the ram's descent. The boundaries of the zones are determined by a programmable controller which limits the high force operation of the punch to a very small area just above the point where the punch contacts the fastener to be applied to a workpiece. An upper operator safety zone restricts this portion of the punch's descent to low pressure operation only and any contact with the punch within this portion of its stroke causes the operation of the machine to be halted and the punch to be returned fully upward to its home position. Also, if the contact is not sensed between the punch and an object within the lower high force zone, the punch also retracts. By controlling operation of the press in this way, operator safety is enhanced because the distance between the end of the punch and the fastener during the high force operation of the press is so small that it is impossible for the operator to get his fingers caught between the punch and the work.

These prior art presses, however, have serious drawbacks. Although the safety features described above protect the operator, there are no means for preventing damage to the workpiece if it is improperly located on the press anvil. Also, if a fastener is misaligned on the workpiece or mislocated with respect to the descending ram, the workpiece can likewise be damaged. In addition, the two-zone system recognizes gross workpiece or fastener misalignments as operator safety faults, thus causing the punch to retract fully to the home position. This results in a great deal of lost time.

Other prior art of which the applicant is aware includes U.S. Pat. No. 4,208,895 to Grigorenko et al; U.S. Pat. No. 4,291,359 to Dieterle; U.S. Pat. No. 4,391,358 to Haeger; U.S. Pat. No. 4,488,237 to Aronson et al; and U.S. Pat. No. 4,489,578 to Nagai et al. While these prior art patents are considered pertinent to the present invention, none is considered anticipatory of the combination of features disclosed and claimed herein. None of these references discloses a workpiece fault detection system where the press will pause only when a fault is detected using a mechanism compactly located within the ram assembly.

SUMMARY OF THE INVENTION

In order to improve upon speed and workpiece protection of prior art presses, changes have been made to the punch position sensor and programmable controller to overcome these deficiencies. It has been discovered that speed and workpiece protection may be achieved by utilizing an extremely high resolution rotary optical encoder for the ram position sensor and by establishing an additional third zone of operation between operator safety zone and the high force work zone. This new middle zone represents a portion of the ram's stroke just above the high force zone of operation. This intermediate new third zone detects workpiece faults and instructs the press to pause when a fault in either the workpiece or fastener alignment is detected.

In the art, portions of the ram descent have been referred to as either "windows" or "zones" interchangeably. For clarity, the terms used herein are given meanings as follows. The "operator safety window" is initial portion of the ram's descent in which the ram is operating under low pressure. The "stop window" is the middle zone which detects workpiece faults and is a central element of the present invention. The "set window" is the zone of operation at the bottom of the stroke where the ram performs its work and is operating under high pressure. This is the lower most zone of operation and is located closely above the contact point with the fastener when it is properly positioned on the workpiece.

The additional workpiece fault zone (stop window) created by this invention is established in the machine controller programing in much the same way as the high force operation zone (set window) of the prior art. That is, the ram is led through the full extent of its travel down to the proper fastener contact point during a preparatory setup run with the fastener and workpiece properly located on the anvil. The stop window is assigned a given height, always measured from the top of the set window with regard to shallow fasteners, such as nuts. Fasteners taller in height, such as studs, may include a stop window located within the operator safety zone as will be further described below. The top of the stop window establishes the bottom of the operator safety zone and, therefore, all three zones are contiguous along the length of the ram's descent.

The length of ram travel within the stop window is approximately in a range from 0.062 to 0.200 inches, and occupies a portion of the ram's descent which is operating only under low pressure. Because the stop window is very small, an extremely high resolution ram position sensor is required to regulate the operation of the machine which replaces the normal ram position sensing device known in the prior art.

As with the prior art, the present invention includes an upper operator safety zone in which any sensed contact with the descending ram will halt the ram's descent and return it to a home position. Similarly, in the lower set window, if the ram does not contact the fastener or a workpiece, it will likewise be halted and be returned to home position. The effect on operation of the ram, should unwanted contact be made in the stop zone, however is different. In this case, the descent of the ram will be halted, but it will not be returned to its home position. According to the present invention, the ram will be halted and will remain stationary to enable the operator to correct the fault condition. Then the operator may instruct the machine to proceed from that point downward in the normal operation of the press.

The inclusion of a third fault detecting stop zone between the operator safety zone and the set zone enables the machine to prevent damage to the workpiece, but not to unduly delay operation of the press. By stopping the ram, rather than returning it to home position, a great amount of time is saved. A workpiece may be damaged by only a slight misalignment on the anvil which can easily and quickly be corrected by the operator. According to the operation of the present device, once the ram has been halted within the stop zone, its descent may be re-initiated by pressing the operator's foot pedal and a safety reset button located on the operator panel simultaneously. This will continue operations and will advance the ram downward under high pressure.

More specifically, the present invention describes a press for assembling fasteners into a workpiece having a frame with a base, comprising: an anvil secured to said base; a ram assembly including a punch attached to the frame above the anvil; a main actuating cylinder connected to said ram assembly and punch for moving said punch along a path between a retracted home position and a position of contact with said fastener or said workpiece located on said anvil; sensing means for sensing when said punch contacts the workpiece, said contact sensing means connected to said ram assembly; sensing means for continuously sensing the position of said punch relative to said anvil, said position sensing means connected to said ram assembly; a controller for limiting the operation of said press, said controller connected to and continuously signalled by both the contact sensing means and said punch position sensing means; and three operational zones established by said controller, each zone representing a linear portion of the ram's descent whereby unwanted punch contact within any of said zones results in either the retraction of the punch to home position, or the stoppage of the punch at the point where the unwanted contact occurred.

It is therefore an object of the present invention to create an industrial press which includes a workpiece fault detection system to prevent workpiece damage if the workpiece is improperly located in the press. It is an additional object of the present invention to prevent workpiece damage if the fastener is improperly located either with respect to the punch or the workpiece. It is a further object of the present invention to create a workpiece fault detection device which requires little additional machine complexity and which does not unduly delay the fast and efficient use of the press.

Other objects and advantages will be readily apparent to those of ordinary skill in the art from the following drawings and description of the preferred embodiment.

BRIEF DESCRIPTION OF THE DRAWINGS

FIG. 3 shows a sectional view of the ram contact sensing means.

FIG. 4 is a chart showing the processing of information from input means to control the operation of the press.

DESCRIPTION OF THE PREFERRED EMBODIMENT

Figure 1:
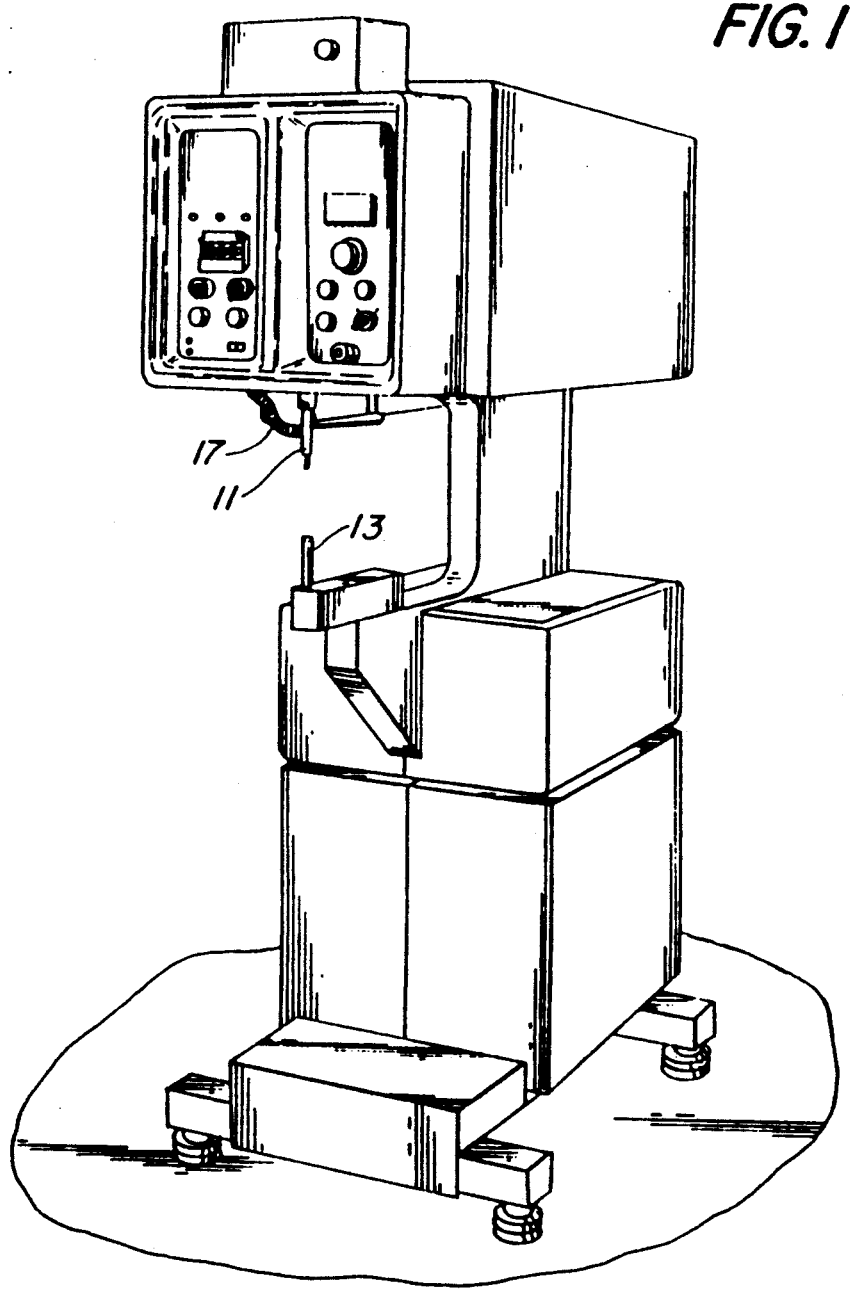
FIG. 1 is a front, right isometric view of the present device.

Referring now to FIG. 1, an assembly press in one embodiment of the present invention shows that the throat area around the anvil 13 and punch 11 are free of any obstruction. The fault detection means are located within the housing of the press and therefore the work area is unobstructed permitting an unencumbered, efficient use of the machine.

Figure 2:
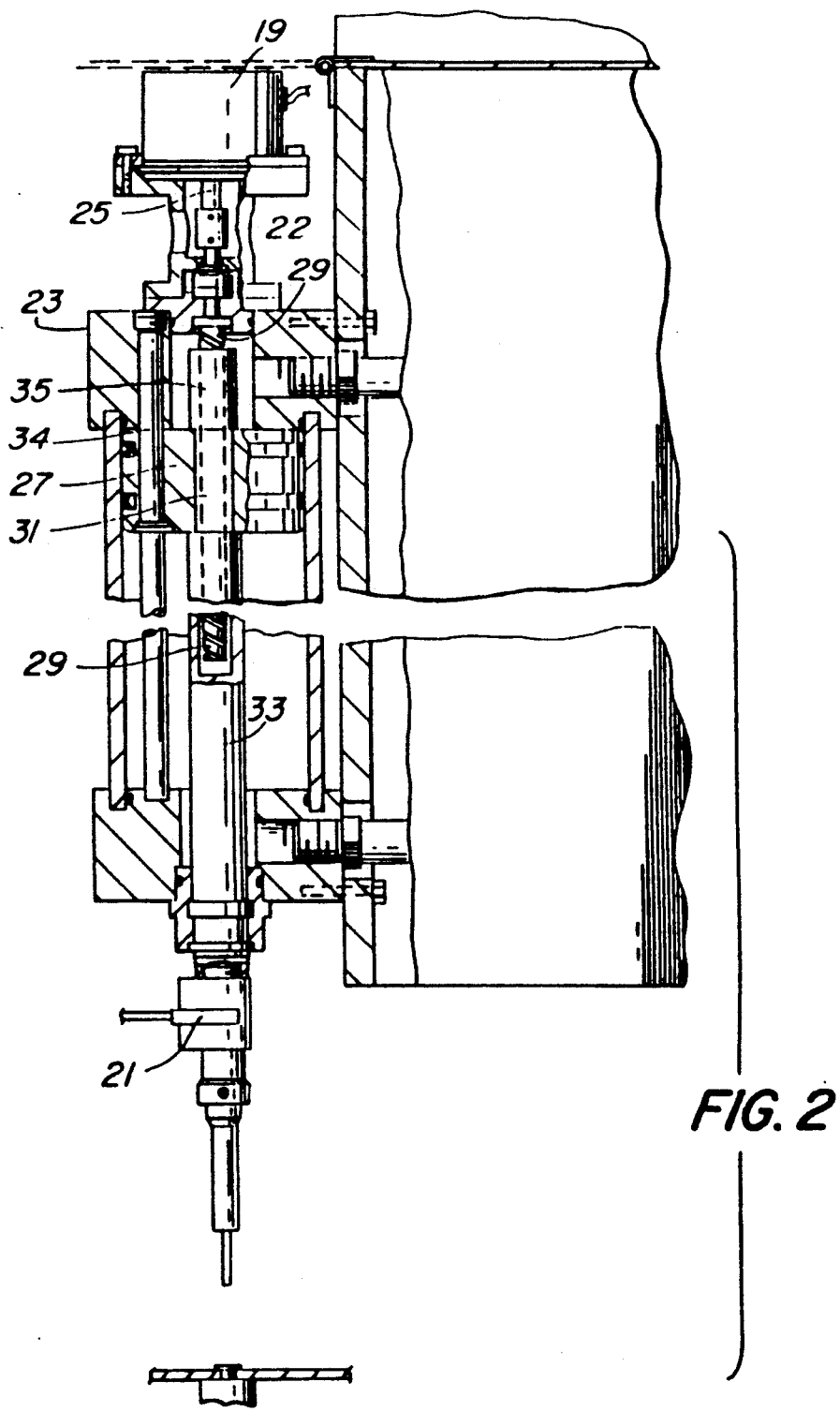
FIG. 2 is a sectional view of the ram assembly, including the piston and encoder linkage.

Referring now to FIG. 2, detail of the position sensor and ram assembly is shown. The major ram components include piston 27 which moves within an hydraulic cylinder that forcibly moves ram rod 33 and the associated punch 11 located at its lower end. Hydraulic ports located on either side of the piston, which is regulated by the valving and hydraulic circuitry well-known in the mechanical arts, control the pressure and movement of the ram rod. The punch position sensing means 19 is a rotary optical encoder which is turned by shaft 25, which is, in turn, connected to piston 27 by way of coupling 22 and ball screw rod 29. The encoder of the preferred embodiment is manufactured by Hewlett-Packard as No. HP-5500. This encoder delivers 500 counts per revolution. Contact sensing is provided by contact switch 21 which is shown in greater detail in FIG. 3.

Referring now to FIG. 3, punch holder sleeve 41 retains punch 11 and is axially movable within switch collar 43. A spring and plunger assembly, including spring 67 and plunger 59 bias the punch in a downward position. Contact switch 37 includes an optical LED circuit which is broken as the punch and punch holder move upward relative to the ram. This punch movement occurs when the descending ram and punch assembly contacts an object during the ram's descent.

Referring now to FIG. 4, this diagram shows the relationship between the control circuitry and the various press operating systems. In the preferred embodiment, a PEMSERTER Series 1000 Press, available from Penn Engineering & Manufacturing Corp. of Danboro, Pa., has been modified as described herein. The Series 1000 Press is a programmable press and it will be readily apparent to those in the electrical arts of a variety of ways in which the programming may be modified to accept the requirement of the additional operating window disclosed herein. The particular software for establishing the stop window may take on many different forms and, therefore, need not be described in detail.

Figure 5:
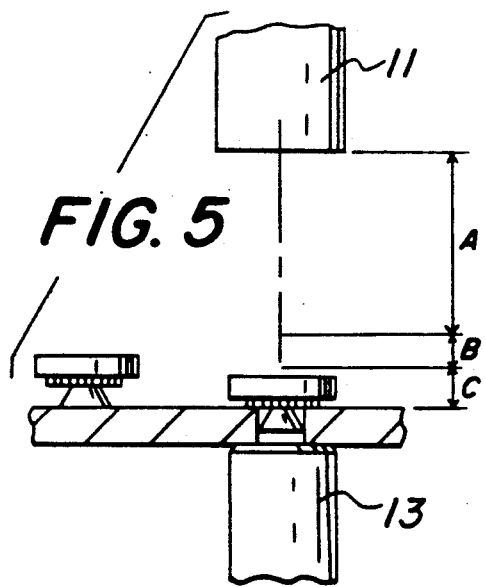
FIGS. 5, 6, 7 and 8 are diagrammatic representations of the various zones of operation.
Figure 6:
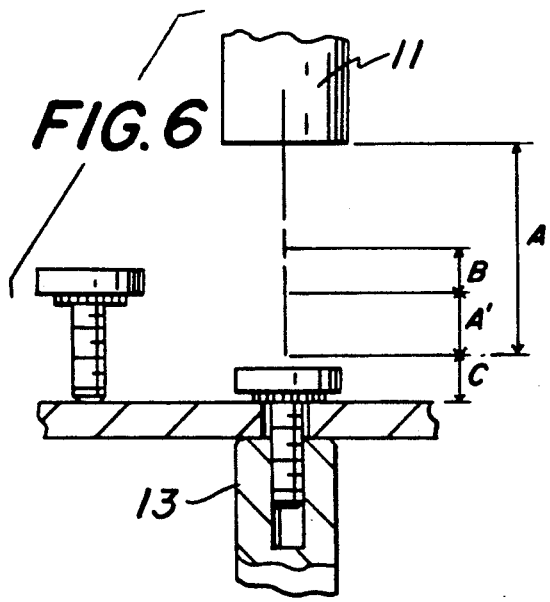

Referring now to FIGS. 5 and 6, the location of the safety stop windows B, and set windows C are shown for both an internally-threaded nut type, self-clinching fastener (FIG. 5) and a stud fastener (FIG. 6). Operator safety window is designated as zone A in both of these figures. As shown in both these diagrams, the stop window represents a very small portion of the ram's descent, just above the normal contact position that the fastener occupies when permanently installed on the sheet prior to pressing. The height of the stop window is fixed after setup for a particular work run, however, it may be changed between runs. Fasteners, such as studs, represent more of a height change due to a misalignment, than do another type of fasteners, such as nuts. Therefore, for example, the stop window for studs may be programmed for a height of 0.200 inches, whereas the stop window for nuts may be programmed for a height of 0.062 inches.

In the preferred embodiment, the stop window has been described as always being established as a measured height taken from the top of the set window. In an alternate embodiment, an additional setup step may be employed so that the stop window of the given height may be established at any point within the operator safety zone as depicted in FIG. 6. In this embodiment, there are four operational zones. Additional zone A' is created between the stop window and the set window, and represents an additional operator safety zone. This may be desirable for example in cases where the height of the fastener is sufficient that an operator's finger may be trapped between the initial contact point and the workpiece. With the stop window occupying a portion within the operator safety zone, contact with the punch both above the set window and below the stop window will cause the ram to fully retract, rather than pause. Therefore, this difference in programming could provide additional operator safety in certain situations.

Figure 7:
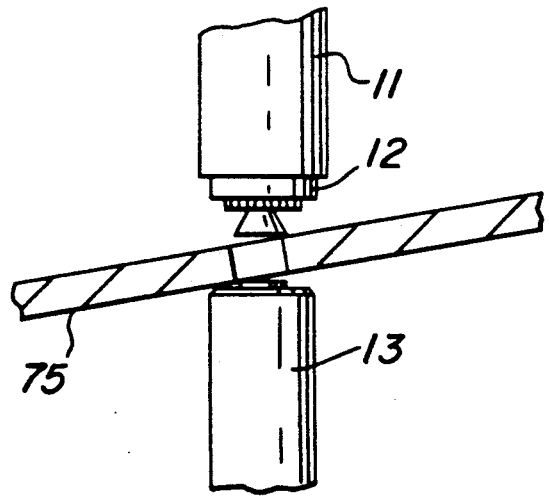
Figure 8:
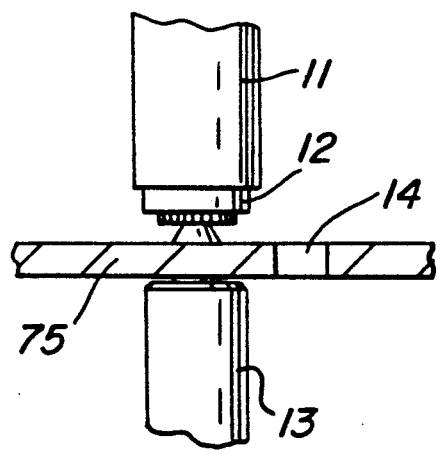

Referring now to FIGS. 7 and 8, two fault conditions commonly experienced during operation of the press are shown. In FIG. 7, the sheet 75 is misplaced on the anvil 13. Fastener 12 is therefore not properly seated on the workpiece prior to pressing and is higher with respect to the anvil than it should be. This excessive fastener height condition caused by the misalignment is not sufficiently great to cause the contact to be within the operator safety zone. In this condition, the punch contact sensing means will indicate contact within the stop zone and, hence, the downward descent of the ram is halted and pauses, rather than retracting to home position. This pause permits the operator to properly align the sheet on the anvil and to thereafter continue the downward descent of the ram without further delay. FIG. 8 shows a condition wherein the sheet is not skewed, but is mislocated. In this condition, the fastener is sitting on the top of the sheet, rather than partially seated in aperture 14. This condition also results in the descent of the ram halting because of the excessive work height detected and permits the operator to properly relocate the sheet before continuing the pressing operation.

It should be understood that the above description discloses specific embodiments of the present invention and are for purposes of illustration only. There may be other modifications and changes obvious to those of ordinary skill in the art which fall within the scope of the present invention which should be limited only by the following claims and their legal equivalents.

What is claimed is:

1. A press for assembling fasteners into a workpiece having a frame with a base, comprising:
    (a) an anvil secured to said base;
    (b) a ram assembly including a punch attached to the frame above the anvil;
    (c) a main actuating cylinder connected to said ram assembly and punch for moving said punch along a path between a retracted home position and a position of contact with said fastener or said workpiece located on said anvil;
    (d) sensing means for sensing when said punch contacts the workpiece, said contact sensing means connected to said ram assembly;
    (e) sensing means for continuously sensing the position of said punch relative to said anvil, said position sensing means connected to said ram assembly;
    (f) a controller for limiting the operation of said press, said controller connected to and continuously signalled by both the contact sensing means and said punch position sensing means; and
    (g) three operational zones established by said controller, each zone representing a linear portion of the ram's descent, wherein said zones are distinct and contiguous between the fully retracted home position of the punch and the point at which the punch makes contact with the anvil, wherein said zones include an upper operator safety window, a lower set window and a stop widow located between said safety and lower set windows wherein unwanted punch contact within either the operator safety window or the set window causes the punch to retract to home position, and unwanted punch contact within the stop window causes the punch to be halted and to remain stationary.

* * * * *